United States Patent
Menon

(10) Patent No.: US 7,318,107 B1
(45) Date of Patent: Jan. 8, 2008

(54) SYSTEM AND METHOD FOR AUTOMATIC STREAM FAIL-OVER

(75) Inventor: Rama R. Menon, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 571 days.

(21) Appl. No.: 09/608,120

(22) Filed: Jun. 30, 2000

(51) Int. Cl.
G06F 11/16 (2006.01)
G06F 15/16 (2006.01)

(52) U.S. Cl. .................. 709/239; 709/203; 709/216; 709/223; 709/224; 709/231; 709/237; 714/13; 700/82

(58) Field of Classification Search .......... 709/239, 709/223, 203, 237, 231, 224, 216; 700/82; 714/13
See application file for complete search history.

(56) References Cited

U.S. PATENT DOCUMENTS

| | | | |
|---|---|---|---|
| 3,363,416 A | 1/1968 | Naeimi et al. | |
| 4,786,130 A | 11/1988 | Georgiou et al. | |
| 4,845,614 A | 7/1989 | Hanawa et al. | |
| 4,866,712 A | 9/1989 | Chao | |
| 4,920,432 A | 4/1990 | Eggers et al. | |
| 4,949,187 A | 8/1990 | Cohen | |
| 4,949,248 A | 8/1990 | Caro | |
| 5,172,413 A | 12/1992 | Bradley et al. | |
| 5,253,341 A | 10/1993 | Rozmanith et al. | |
| 5,291,554 A | 3/1994 | Morales | |
| 5,371,532 A | 12/1994 | Gelman et al. | |
| 5,410,343 A | 4/1995 | Coddington et al. | |
| 5,414,455 A | 5/1995 | Hooper et al. | |
| 5,440,688 A | 8/1995 | Nishida | |
| 5,442,389 A | 8/1995 | Blahut et al. | |
| 5,442,390 A | 8/1995 | Hooper et al. | |
| 5,442,749 A | 8/1995 | Northcutt et al. | |
| 5,448,723 A | 9/1995 | Rowett | |
| 5,452,448 A * | 9/1995 | Sakuraba et al. | 707/201 |
| 5,461,415 A * | 10/1995 | Wolf et al. | 725/88 |
| 5,463,768 A | 10/1995 | Cuddihy et al. | |
| 5,475,615 A | 12/1995 | Lin | |
| 5,508,732 A | 4/1996 | Bottomley et al. | |
| 5,515,511 A | 5/1996 | Nguyen et al. | |
| 5,519,435 A | 5/1996 | Anderson | |
| 5,528,281 A | 6/1996 | Grady et al. | |

(Continued)

FOREIGN PATENT DOCUMENTS

EP  0 649 121 A2  10/1994

(Continued)

OTHER PUBLICATIONS

Definition of "failover" from onelook.com, printed Aug. 1, 2007, p. 1.*

(Continued)

*Primary Examiner*—David Wiley
*Assistant Examiner*—Alina Boutah
(74) *Attorney, Agent, or Firm*—Blakely, Sokoloff, Taylor & Zafman LLP

(57) ABSTRACT

A method is described comprising: maintaining a plurality of data relating to client streaming connections across a plurality of servers; and assigning a particular client streaming connection to a first server upon detecting that a second server previously serving a streaming connection to the client has become inoperative.

22 Claims, 7 Drawing Sheets

U.S. PATENT DOCUMENTS

| | | | |
|---|---|---|---|
| 5,544,313 A | 8/1996 | Shachnai et al. | |
| 5,544,327 A | 8/1996 | Dan et al. | |
| 5,550,577 A | 8/1996 | Verbiest et al. | |
| 5,550,863 A | 8/1996 | Yurt et al. | |
| 5,550,982 A | 8/1996 | Long et al. | |
| 5,557,317 A | 9/1996 | Nishio et al. | |
| 5,568,181 A | 10/1996 | Greenwood et al. | |
| 5,614,940 A | 3/1997 | Cobbley et al. | |
| 5,675,723 A * | 10/1997 | Ekrot et al. | 714/4 |
| 5,696,895 A * | 12/1997 | Hemphill et al. | 714/4 |
| 5,703,938 A | 12/1997 | Lucas et al. | |
| 5,704,031 A | 12/1997 | Mikami et al. | |
| 5,712,976 A | 1/1998 | Falcon, Jr. et al. | |
| 5,774,660 A | 6/1998 | Brendel et al. | |
| 5,778,187 A | 7/1998 | Monteiro et al. | |
| 5,805,824 A | 9/1998 | Kappe | |
| 5,812,751 A * | 9/1998 | Ekrot et al. | 714/4 |
| 5,813,009 A | 9/1998 | Johnson et al. | |
| 5,832,069 A | 11/1998 | Waters et al. | |
| 5,870,553 A | 2/1999 | Shaw et al. | |
| 5,875,300 A | 2/1999 | Kamel et al. | |
| 5,892,913 A * | 4/1999 | Adiga et al. | 709/219 |
| 5,892,915 A * | 4/1999 | Duso et al. | 709/219 |
| 5,923,840 A | 7/1999 | Desnoyers et al. | |
| 5,933,835 A | 8/1999 | Adams et al. | |
| 5,933,837 A | 8/1999 | Kung | |
| 5,948,062 A * | 9/1999 | Tzelnic et al. | 709/219 |
| 5,956,716 A | 9/1999 | Kenner et al. | |
| 5,987,621 A * | 11/1999 | Duso et al. | 709/224 |
| 6,003,030 A | 12/1999 | Kenner et al. | |
| 6,011,881 A | 1/2000 | Moslehi et al. | |
| 6,016,509 A | 1/2000 | Dedrick | |
| 6,016,512 A | 1/2000 | Huitema | |
| 6,023,470 A | 2/2000 | Lee et al. | |
| 6,026,452 A | 2/2000 | Pitts | |
| 6,035,412 A * | 3/2000 | Tamer et al. | 714/6 |
| 6,061,504 A * | 5/2000 | Tzelnic et al. | 709/219 |
| 6,067,545 A | 5/2000 | Wolff | |
| 6,070,191 A | 5/2000 | Narendran et al. | |
| 6,078,960 A | 6/2000 | Ballard | |
| 6,085,193 A | 7/2000 | Malkin et al. | |
| 6,098,096 A | 8/2000 | Tsirgotis et al. | |
| 6,108,703 A | 8/2000 | Leighton et al. | |
| 6,112,239 A | 8/2000 | Kenner et al. | |
| 6,112,249 A * | 8/2000 | Bader et al. | 709/239 |
| 6,115,752 A | 9/2000 | Chauhan | |
| 6,122,752 A | 9/2000 | Farah | |
| 6,134,673 A * | 10/2000 | Chrabaszcz | 714/13 |
| 6,151,632 A | 11/2000 | Chaddha et al. | |
| 6,161,008 A | 12/2000 | Lee et al. | |
| 6,178,445 B1 | 1/2001 | Dawkins et al. | |
| 6,195,680 B1 | 2/2001 | Goldszmidt et al. | |
| 6,216,051 B1 * | 4/2001 | Hager et al. | 700/82 |
| 6,223,206 B1 | 4/2001 | Dan et al. | |
| 6,230,200 B1 * | 5/2001 | Forecast et al. | 709/226 |
| 6,233,607 B1 | 5/2001 | Taylor et al. | |
| 6,233,618 B1 | 5/2001 | Shannon | |
| 6,233,623 B1 | 5/2001 | Jeffords et al. | |
| 6,240,462 B1 | 5/2001 | Agraharam et al. | |
| 6,256,634 B1 | 7/2001 | Moshaiov et al. | |
| 6,266,335 B1 | 7/2001 | Bhaskaran | |
| 6,298,376 B1 | 10/2001 | Rosner et al. | |
| 6,298,455 B1 * | 10/2001 | Knapman et al. | 709/223 |
| 6,301,711 B1 | 10/2001 | Nusbickel | |
| 6,305,019 B1 | 10/2001 | Dyer et al. | |
| 6,317,787 B1 | 11/2001 | Boyd et al. | |
| 6,321,252 B1 * | 11/2001 | Bhola et al. | 709/204 |
| 6,324,582 B1 | 11/2001 | Sridhar et al. | |
| 6,330,250 B1 | 12/2001 | Curry et al. | |
| 6,332,157 B1 | 12/2001 | Mighdoll et al. | |
| 6,345,294 B1 | 2/2002 | O'Tool et al. | |
| 6,351,775 B1 | 2/2002 | Yu et al. | |
| 6,351,776 B1 | 2/2002 | O'Brien et al. | |
| 6,356,916 B1 | 3/2002 | Yamatari et al. | |
| 6,363,497 B1 * | 3/2002 | Chrabaszcz | 714/13 |
| 6,370,571 B1 | 4/2002 | Medin, Jr. | |
| 6,378,129 B1 * | 4/2002 | Zetts | 725/94 |
| 6,381,627 B1 | 4/2002 | Kwan et al. | |
| 6,385,690 B1 * | 5/2002 | Iida et al. | 711/103 |
| 6,389,462 B1 | 5/2002 | Cohen et al. | |
| 6,408,407 B1 | 6/2002 | Sadler | |
| 6,415,368 B1 | 7/2002 | Glance et al. | |
| 6,421,714 B1 | 7/2002 | Rai et al. | |
| 6,427,163 B1 | 7/2002 | Arendt et al. | |
| 6,438,595 B1 | 8/2002 | Blumenau et al. | |
| 6,442,588 B1 | 8/2002 | Clarke et al. | |
| 6,445,784 B2 | 9/2002 | Uppaluru et al. | |
| 6,446,224 B1 | 9/2002 | Chang et al. | |
| 6,457,011 B1 | 9/2002 | Brace et al. | |
| 6,466,949 B2 | 10/2002 | Yang et al. | |
| 6,466,980 B1 | 10/2002 | Lumelsky et al. | |
| 6,484,143 B1 * | 11/2002 | Swildens et al. | 705/1 |
| 6,487,555 B1 | 11/2002 | Bharat et al. | |
| 6,502,125 B1 | 12/2002 | Kenner et al. | |
| 6,502,205 B1 | 12/2002 | Yanai et al. | |
| 6,516,350 B1 | 2/2003 | Lumelsky et al. | |
| 6,538,996 B1 | 3/2003 | West et al. | |
| 6,539,381 B1 | 3/2003 | Prasad et al. | |
| 6,564,380 B1 | 5/2003 | Murphy | |
| 6,598,071 B1 | 7/2003 | Hayashi et al. | |
| 6,604,117 B2 | 8/2003 | Lim et al. | |
| 6,697,806 B1 * | 2/2004 | Cook | 707/10 |
| 6,732,186 B1 * | 5/2004 | Hebert | 709/239 |
| 6,735,717 B1 * | 5/2004 | Rostowfske et al. | 714/13 |
| 6,779,034 B1 | 8/2004 | Mundy et al. | |
| 6,799,221 B1 | 9/2004 | Kenner et al. | |
| 6,804,703 B1 * | 10/2004 | Allen et al. | 709/216 |
| 6,816,904 B1 | 11/2004 | Ludwig et al. | |
| 6,823,348 B2 | 11/2004 | Benayoun et al. | |
| 6,920,454 B1 | 7/2005 | Chan | |
| 6,959,368 B1 * | 10/2005 | St. Pierre et al. | 711/162 |
| 6,970,913 B1 * | 11/2005 | Albert et al. | 709/217 |
| 6,983,317 B1 * | 1/2006 | Bishop et al. | 709/223 |
| 7,013,322 B2 | 3/2006 | Lahr | |
| 7,111,052 B1 * | 9/2006 | Cook | 709/219 |
| 2001/0044851 A1 * | 11/2001 | Rothman et al. | 709/231 |
| 2002/0007494 A1 | 1/2002 | Hodge | |
| 2003/0055967 A1 * | 3/2003 | Worley | 709/226 |

FOREIGN PATENT DOCUMENTS

| | | | |
|---|---|---|---|
| EP | 0 651 554 A1 | | 10/1994 |
| WO | WO 97/42582 | * | 11/1997 |
| WO | WO9742582 A | | 11/1997 |
| WO | WO 9859486 | | 12/1998 |
| WO | WO 99/48246 | * | 9/1999 |
| WO | WW 9948246 A | | 9/1999 |

OTHER PUBLICATIONS

Berra, P.B., et al., "Architecture for Distributed Database Systems," *Computer Communications*, vol. 13, No. 4, May 1, 1990, pp. 217-231.

Little, T.D.C., et al., "Selection and Disseminatrion of Digital Video via the Virtual Video Broswer," *Multimedia Tools and Applications*, vol. 1, No. 2, Jun. 1995 (Netherlands), pp. 149-172.

Vin, Harrick, Multimedia Broadcasting Over The Internet: Part 1, Oct. 1998, IEEE Multimedia, IEEE Computer Society, US, vol. 5, NR.4, pp. 78-82 XP000788442, ISN: 1070-986X—Entire Document.

Rodriguez, P. et al, "Improving the WWW: Caching or Multicast?", Computer Networks and ISDN Systems, North Holland Publishing. Amsterdam, NL, vol. 30, No. 22-23 Nov. 1998, pp. 2223-2243, ISSN: 0169-7552.

Anawat Chankhunthod, et al., "A Hierarchical Internet Object Cache", Computer of Science Department, University of Sourther California, University of Colorado-Boulder, USENIX, San Diego, California, Jan. 1996, 12 pages.

Michael A. Goulde, "Network Caching Guide, Optimizing Web Content Delivery", Patricia Seyold Group, E-Business Thought Leaders, Mar. 1999, pp. i-ii, and 1-41, Boston, MA.

* cited by examiner

CONNECTION DATA

| Client ID | 1020359 |
|---|---|
| IP Address | 129.30.101.50 |
| State | Active |
| Streaming Format | RTSP |
| Media ID | 1334245 |
| Media Offset | 3ff5 |
| TCP Port | 80 |
| Network Address Translation | N/A |
| Max Bit-Rate | 56 Kbit/sec |
| Actual Bit-Rate | 56 Kbit/sec |

| Client ID | 1020360 |
|---|---|
| IP Address | 129.30.101.51 |
| State | Paused |
| Streaming Format | RTSP |
| Media ID | 3433577 |
| Media Offset | 1024 |
| TCP Port | 124 |
| Network Address Translation | NAT Data |
| Max Bit-Rate | 144 Kbit/sec |
| Actual Bit-Rate | 56 Kbit/sec |

| Client ID | 1020361 |
|---|---|
| IP Address | 129.30.101.52 |
| State | Ended |
| Media ID | 1113288 |
| Streaming Format | ASF |
| Media Offset | 1075 |
| TCP Port | 124 |
| Network Address Translation | NAT Data |
| Max Bit-Rate | 1 Mbit/sec |
| Actual Bit-Rate | 144 Kbit/sec |

| Client ID | 1020362 |
|---|---|
| IP Address | 129.30.101.53 |
| State | Active |
| Media ID | 67682736 |
| Streaming Format | RTSP |
| Media Offset | 0901 |
| TCP Port | 24 |
| Network Address Translation | NAT Data |
| Max Bit-Rate | 56 Kbit/sec |
| Actual Bit-Rate | 56 Kbit/sec |

FIG. 5

SYSTEM AND METHOD FOR AUTOMATIC STREAM FAIL-OVER

BACKGROUND OF THE INVENTION

1. Field of the Invention

This invention relates generally to the field of network services. More particularly, the invention relates to an improved architecture for providing fault tolerant data communication.

2. Description of the Related Art

As is known in the art, streaming is a mechanism for playing back audio and/or video content over a network in-real-time, typically used in situations where network bandwidth is limited. The basic streaming concept is that the destination (e.g., a client) begins to play back the underlying streaming file from a buffer before the entire file has been received from its source.

A traditional network streaming system is illustrated in FIG. 1. As shown, one or more clients 150, 160, configured with streaming application software such as RealPlayer® from RealNetworks® or Windows Media® Player from Microsoft® Corporation, communicate with one or more streaming servers 110, 111, . . . N, over a network 100 (e.g., the Internet). The group of streaming servers 110, 111, . . . N, are located together at a point of presence ("POP") site. Each of the streaming servers 110, 111, . . . N, may store a copy of the same streaming data or, alternatively, may store different streaming data, depending on the configuration at the POP site 130.

In operation, when a client 150 requests a particular streaming file from a server at the POP site 130, the request is received by a load balancer module 120, which routes the request to an appropriate streaming server 111. Which server is "appropriate" may depend on where the requested file is stored, the load on each server 110, 111, . . . N, and/or the type of streaming file requested by the client (e.g., Windows Media format or RealPlayer format). Once the file has been identified by the load balancer 120 on an appropriate server—server 111 in the illustrated example—it is streamed to the requesting client 150 (represented by stream 140) through the network 100.

One problem with current systems for streaming multimedia content, however, is that when delivery of a stream to a client/player 150 is interrupted, there is no automated mechanism for correcting the interruption (e.g., providing another source for the stream) without some type of manual intervention. For example, if server 111 in FIG. 1 were to crash while streaming content to client 150, the client's multimedia stream would be interrupted. The client 150 (or, rather, the streaming application) would then manually attempt to reconnect to the server 111 through the load balancer 120.

The problem is even more serious if the client 150 is receiving a stream of a live event or a scheduled event (e.g., such as a "Web-cast"). In this case, by the time the client 150 reestablished a connection, a significant portion of the event would simply be unavailable to the client 150. In sum, current streaming applications do not provide any mechanism for automatically and seamlessly reestablishing a streaming session with a client, once the initial session has been interrupted.

Accordingly, what is needed is a system and method for providing fault tolerance and/or automatic fail-over techniques with respect to streaming multimedia content over a network.

BRIEF DESCRIPTION OF THE DRAWINGS

A better understanding of the present invention can be obtained from the following detailed description in conjunction with the following drawings, in which:

FIG. 5 illustrates client streaming information stored in accordance with one embodiment of the invention.

DETAILED DESCRIPTION

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the invention.

An Exemplary Network Architecture

Figure 1:
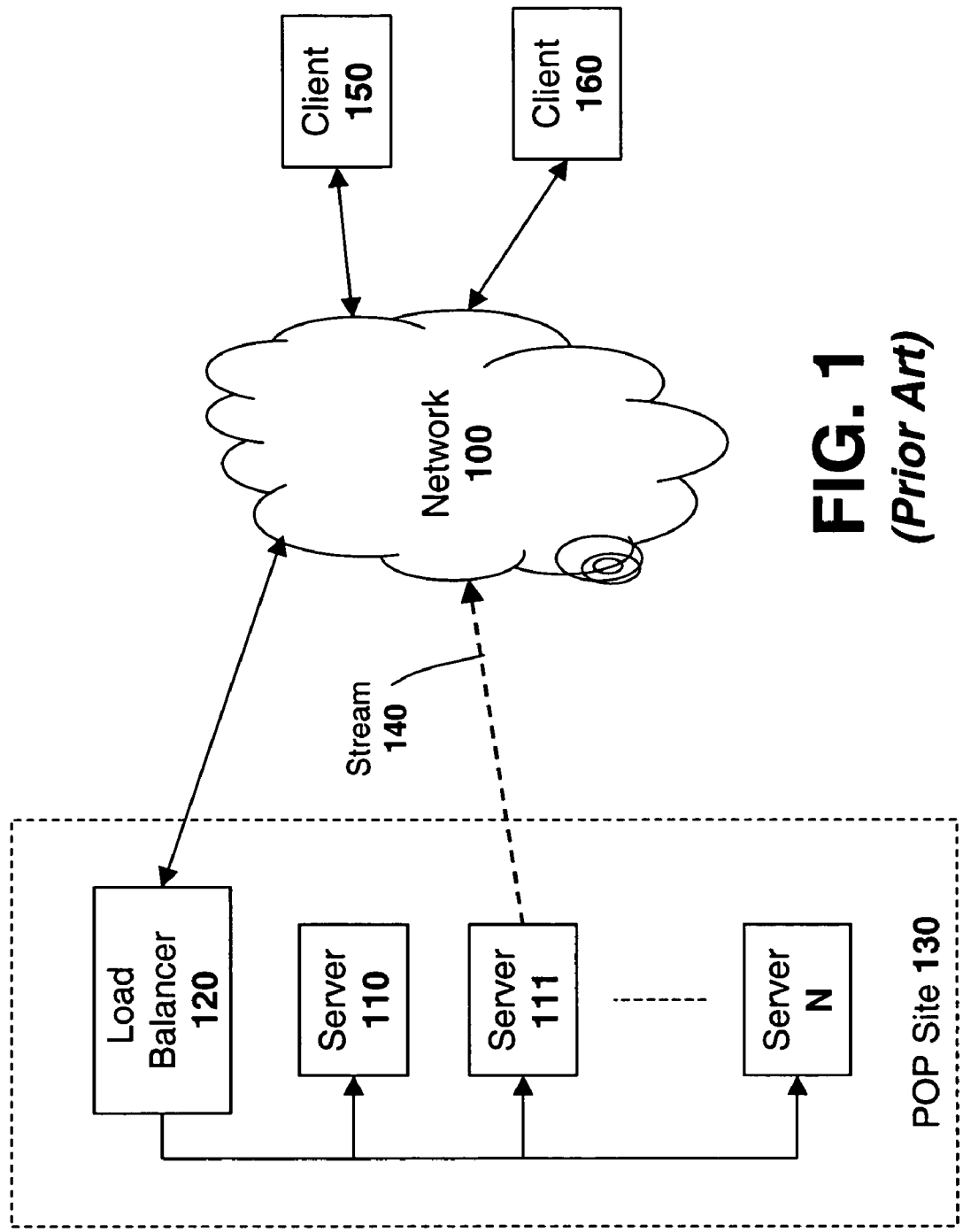
FIG. 1 illustrates a prior art system and method for streaming content over a network.
Figure 2:
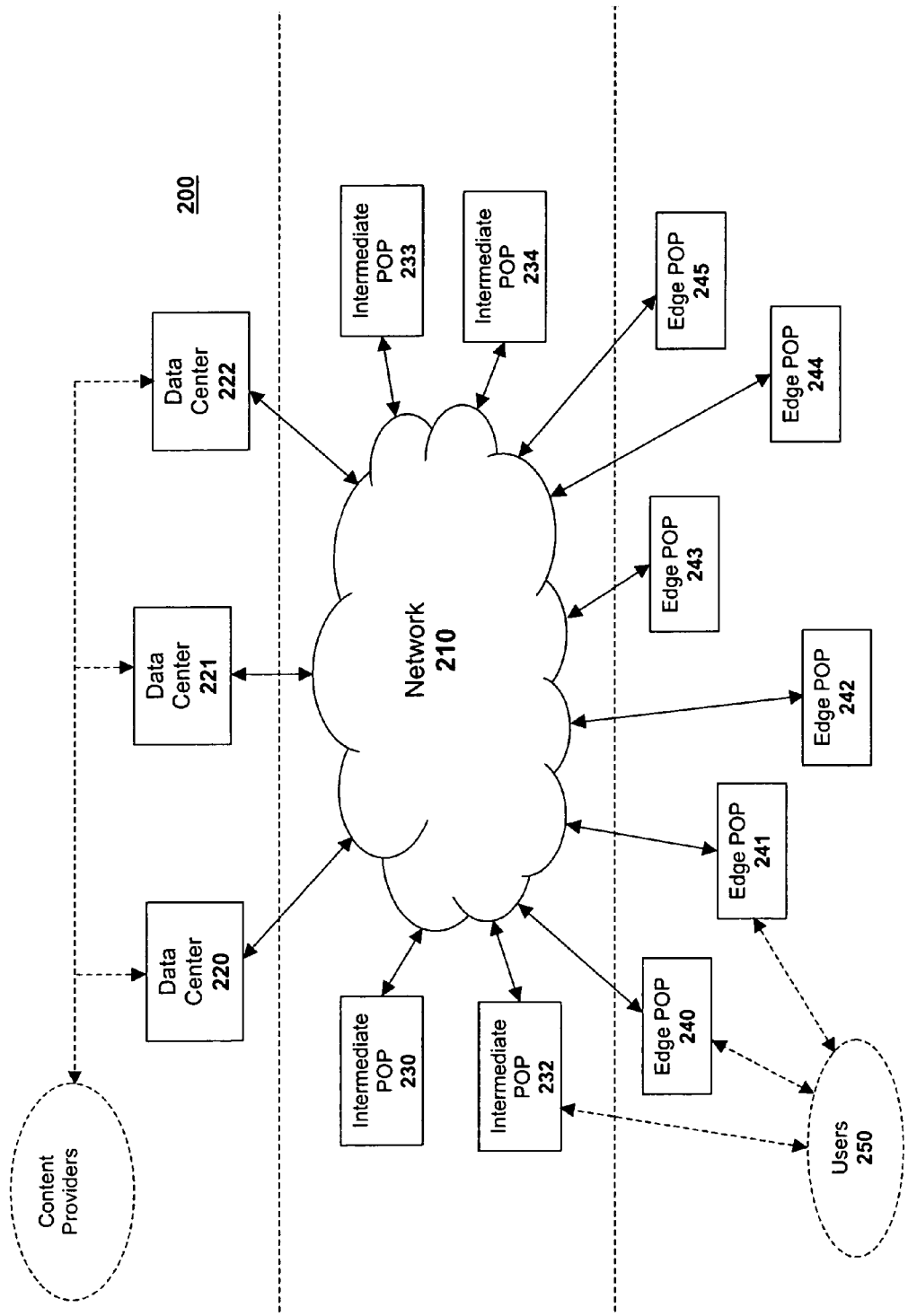
FIG. 2 illustrates an exemplary network architecture including elements of the invention.

Elements of the present invention may be included within a multi-tiered networking architecture 200 such as that illustrated in FIG. 2, which includes one or more data centers 220-222, a plurality of "intermediate" Point of Presence ("POP") nodes 230-234 (also referred to herein as "Private Network Access Points," or "P-NAPs"), and a plurality of "edge" POP nodes 240-245 (also referred to herein as "Internet Service Provider Co-Location" sites or "ISP Co-Lo" sites).

According to the embodiment depicted in FIG. 2, each of the data centers 220-222, intermediate POPs 230-234 and/or edge POPs 240-245 are comprised of groups of network servers on which various types of network content may be stored and transmitted to end users 250, including, for example, Web pages, network news data, e-mail data, File Transfer Protocol ("FTP") files, and live & on-demand multimedia streaming files. It should be noted, however, that the underlying principles of the invention may be practiced using a variety of different types of network content.

The servers located at the data centers 220-222 and POPs 230-234; 240-245 may communicate with one another and with end users 150 using a variety of communication channels, including, for example, Digital Signal ("DS") channels (e.g., DS-3/T-3, DS-1/T1), Synchronous Optical Network ("SONET") channels (e.g., OC-3/STS-3), Integrated Services Digital Network ("ISDN") channels, Digital Subscriber Line ("DSL") channels, cable modem channels and a variety of wireless communication channels including satellite broadcast and cellular.

In addition, various networking protocols may be used to implement aspects of the system including, for example, the Asynchronous Transfer Mode ("ATM"), Ethernet, and Token Ring (at the data-link level); as well as Transmission Control Protocol/Internet Protocol ("TCP/IP"), Internetwork Packet Exchange ("IPX"), AppleTalk and DECnet (at the network/transport level). It should be noted, however, that the principles of the invention are not limited to any particular communication channel or protocol.

In one embodiment, a database for storing information relating to distributed network content is maintained on servers at the data centers 220-222 (and possibly also at the POP nodes 230-234; 240-245). The database in one embodiment is a distributed database (i.e., spread across multiple servers) and may run an instance of a Relational Database Management System (RDBMS), such as Microsoft™ SQL-Server, Oracle™ or the like.

An Exemplary Computer Architecture

Figure 3:
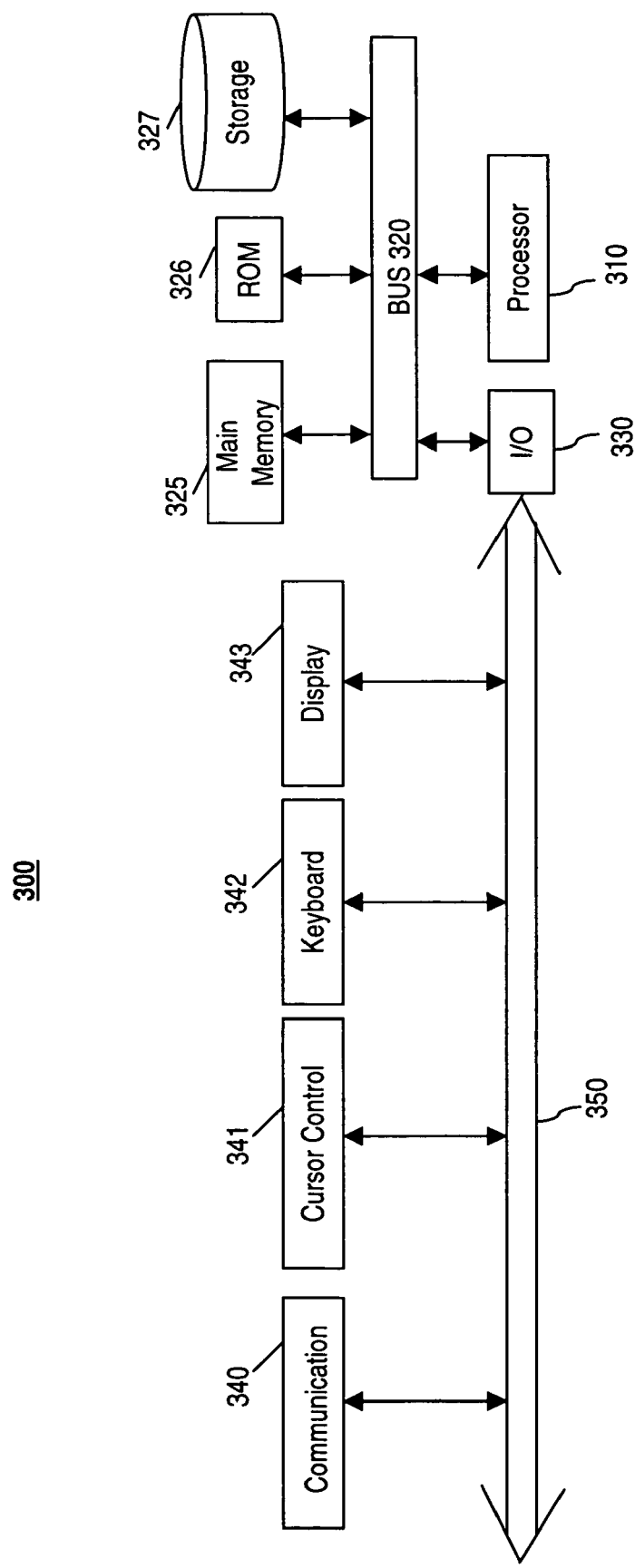
FIG. 3 illustrates an exemplary computer architecture including elements of the invention.

Having briefly described an exemplary network architecture which employs various elements of the present invention, a computer system 300 representing exemplary clients and servers for implementing elements of the present invention will now be described with reference to FIG. 3.

One embodiment of computer system 300 comprises a system bus 320 for communicating information, and a processor 310 coupled to bus 320 for processing information. The computer system 300 further comprises a random access memory (RAM) or other dynamic storage device 325 (referred to herein as "main memory"), coupled to bus 320 for storing information and instructions to be executed by processor 310. Main memory 325 also may be used for storing temporary variables or other intermediate information during execution of instructions by processor 310. Computer system 300 also may include a read only memory ("ROM") and/or other static storage device 326 coupled to bus 320 for storing static information and instructions used by processor 310.

A data storage device 327 such as a magnetic disk or optical disc and its corresponding drive may also be coupled to computer system 300 for storing information and instructions. The computer system 300 can also be coupled to a second I/O bus 350 via an I/O interface 330. A plurality of I/O devices may be coupled to I/O bus 350, including a display device 343, and/or an input device (e.g., an alphanumeric input device 342 and/or a cursor control device 341).

The communication device 340 is used for accessing other computers (servers or clients) via a network 100. The communication device 340 may comprise a modem, a network interface card, or other well known interface device, such as those used for coupling to Ethernet, token ring, or other types of computer networks.

EMBODIMENTS OF THE INVENTION

Figure 4A:
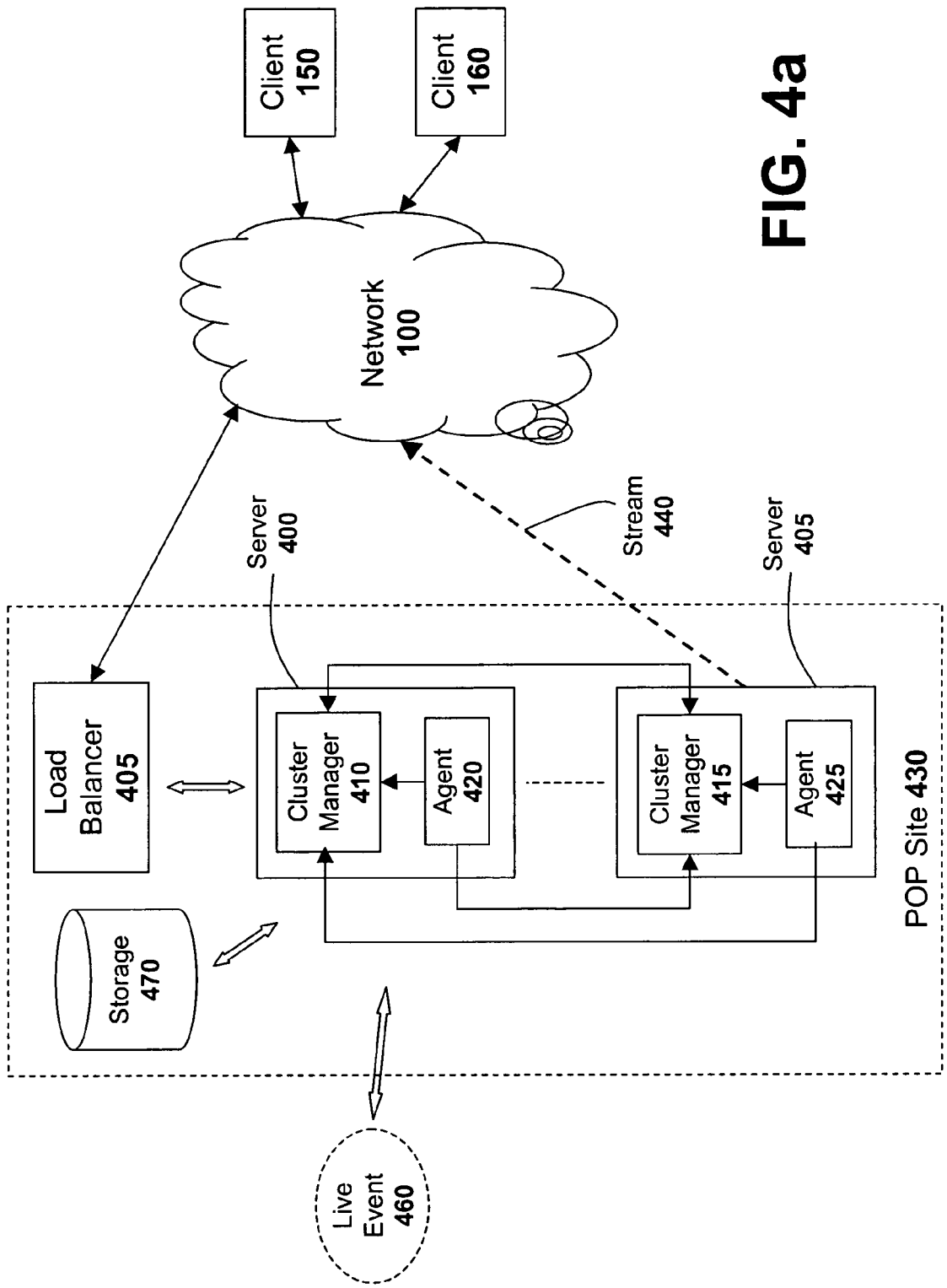
FIGS. 4a and 4b illustrate embodiments of a system and method for streaming content over a network.

One embodiment of the invention, illustrated in FIG. 4a, provides an automatic fail-over solution for content streaming. The cluster of streaming servers 400, . . . N, in this embodiment actively share client data between one another relating to current client streaming connections. Accordingly, when a client-server streaming connection is lost (e.g., due to a server crash), a different server reestablishes a connection to the client at a point in the streaming file where the previous server left off.

In one embodiment, a cluster manager 410, 415 maintains up-to-date connection data for each client. The cluster manager 410, 415 may reside on one server at the POP site 430 or multiple servers, depending on the particular configuration (although illustrated in FIG. 4a in a multiple server configuration). Moreover, in one embodiment, the cluster manager 410, 415 may be distributed across multiple POP sites (see, e.g., FIG. 6 described below).

In one embodiment, the cluster manager 410, 415 receives client connection updates from cluster agents 425, 420 running on various streaming servers 400, 405 at the POP site 430. For example, when a client 150 initially connects to a particular streaming server 405 (e.g., through the load balancer 405), a cluster agent 425 running on that server 405 transmits connection data pertaining to that client to the cluster manager 410, 415. In addition, in one embodiment, the cluster agent 425 regularly transmits client connection updates to the cluster manager 410, 415 at predetermined intervals. Thus, the client data maintained by the cluster manager 410, 415 is kept up-to-date.

As illustrated in FIG. 5, various types of client connection data may be collected and transmitted by the cluster manager 410, 415, including, for example, an identification code assigned by the cluster agent 425, the client's Internet Protocol ("IP") address, the current state of the streaming connection (e.g., active, paused, ended, . . . etc), a media identification code indicating the particular streaming content requested by the client (including a network path), the type of streaming protocol used to stream the content (e.g., real time streaming protocol, active streaming format, . . . etc), a media offset indicating the point in time to which the multimedia stream has progressed, and various networking data such as the Transmission Control Protocol ("TCP") port, Network Address Translation data (if any), the maximum supported client bit-rate and/or the actual bit-rate used in the stream delivered to the client. In one embodiment, copies of the foregoing client data are maintained on multiple streaming servers by the cluster manager 410, 415.

As described above, in one embodiment, cluster agents 420,425, running on the streaming servers 400, 405 send client connection updates to the cluster manager 410,415 at predetermined intervals. Accordingly, in one embodiment, the cluster manager 410, 415 uses this periodic update as a "heartbeat" to detect when a particular streaming server has become inoperative (or, alternatively, to detect other problems with the server such as an unmanageable server load or a server communications/network problem). If the cluster manager 410, 415 does not receive an update from a server after one or more update periods have elapsed, it may conclude that the server is inoperative. Alternatively, before arriving at this conclusion, the cluster manager 410, 415 may first attempt to communicate with the server to verify that the server is, in fact, inoperative.

Figure 4B:
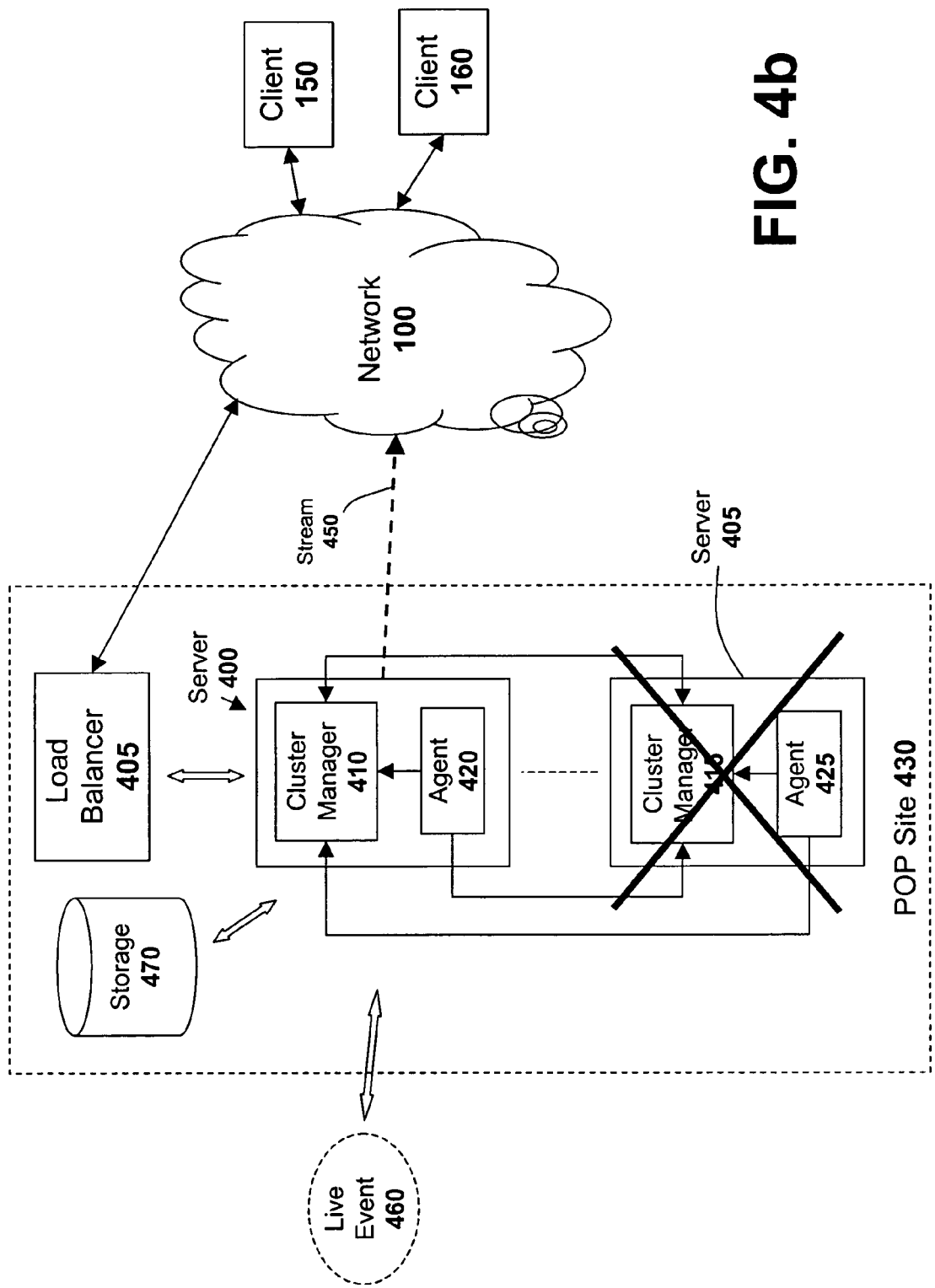

Regardless of how the cluster manager 410, 415 determines that a server is inoperative, once it does, it attempts to reassign each of the client connections supported by the inoperative server to an operative server. Thus, as illustrated in FIG. 4b, if server 405 crashes while serving a stream 440 to a client 150, the cluster manager 410 will reestablish a new stream 450 with the client 150 from a different streaming server 400. Moreover, because client streaming data (such as the data illustrated in FIG. 5) is continually updated at the client manager 410, the new streaming server 400 will begin serving the client 150 at the same point in the stream (i.e., at the same media offset) at which the original server 405 became inoperative. In a live stream embodiment, there may be a slight loss of stream data while the connection is re-established. In addition, the new server 400 will know the exact streaming configuration (e.g., bit-rate, streaming format, . . . etc) required to stream data to the client 150.

The foregoing reallocation mechanism may be employed regardless of whether the original stream was of a live/scheduled event 460 (e.g., a Webcast) or a previously-stored audio/video file. In one embodiment, each of the streaming servers 400, 405, may be configured to buffer a predetermined portion of the streaming data for the live event 460. Accordingly, if a server 405 crashes, the new server 400 assigned by the cluster manager 410 can begin streaming the event at the exact point (stored in the buffer) where the original server 405 became inoperative.

The cluster manager 410 may assign servers to handle the streams of the inoperative server based on a variety of factors. For example, in one embodiment, the assignment may be based on the relative load on each of the servers at a given point in time. The assignment may also be based on the type of content supported by the servers. For example, some servers may be configured to support only real time streaming protocol ("RTSP") requests, while the other may be configured to support only active streaming format ("ASF") requests. Various additional factors may be evaluated for the purpose of making an assignment while still complying with the underlying principles of the invention.

In one embodiment, after the various client streams are reassigned to new servers, the load balancer module 405 is notified of the new server assignments so that it can properly distribute new client requests based on server load. In one embodiment, the load balancer module 405 is a layer 4 switch, capable of directing client requests to a particular server based on the type of streaming service being requested by the client (e.g., based on a virtual IP address associated with the service) and/or the server.

Figure 6:
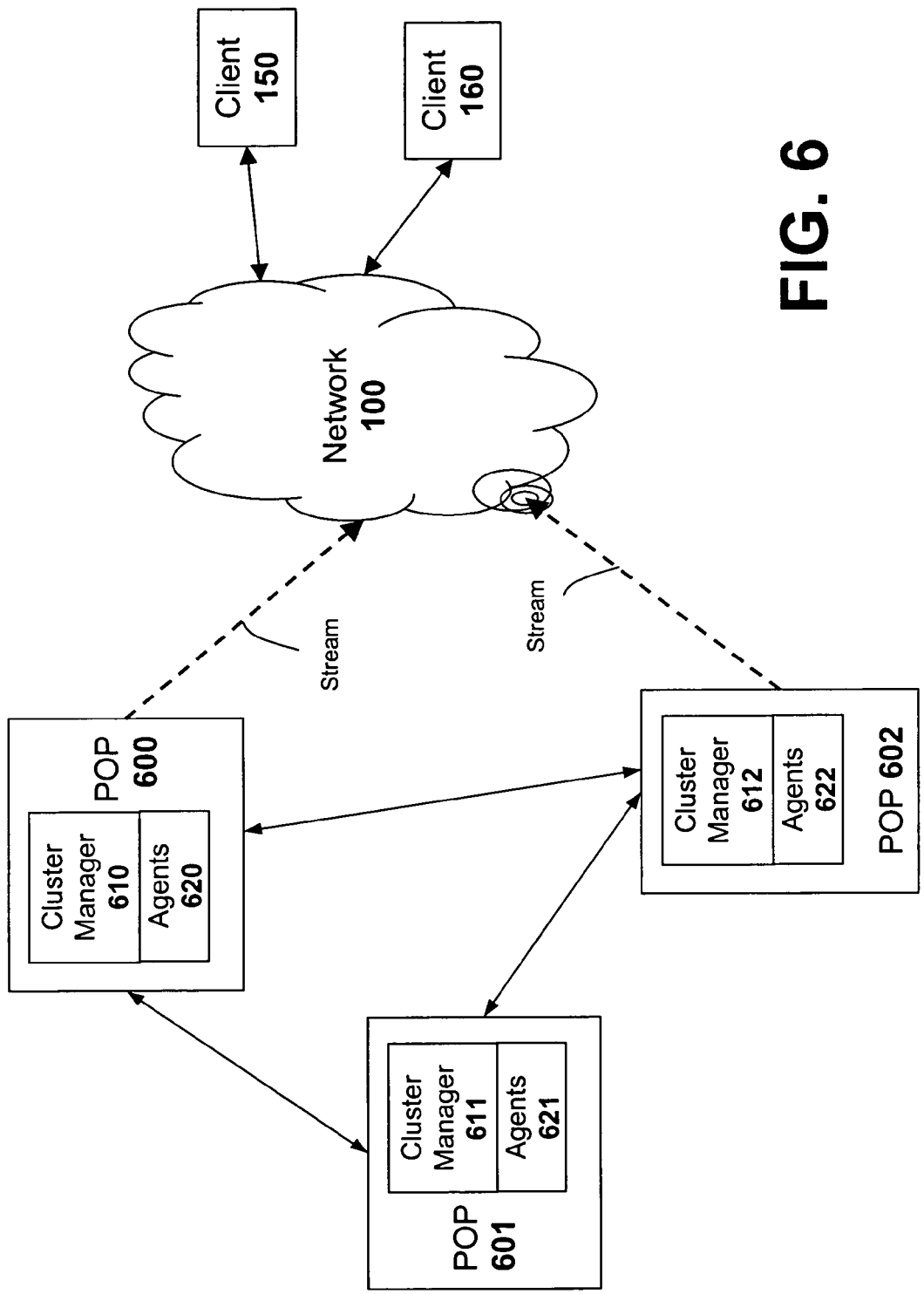
FIG. 6 illustrates coordination between various different point of presence sites according to one embodiment of the invention.

As illustrated in FIG. 6, in one embodiment, cluster managers 610-612 and/or agents 620-622 from different POP sites 600-602 may communicate with one another. Accordingly, in this embodiment, if the server capacity at a particular POP site 602 has been reached when one of the servers at that site becomes inoperative, the client manager 612 may assign a server from a different site 600 to handle the client streams previously supported by the inoperative server. In this embodiment, cluster managers 610-612 and/or cluster agents 620-622 at different sites continually exchange data relating to client streaming connections. As such, a server from a completely different site 600 will begin streaming data to a client at the same point in the stream at which the previous server became inoperative, using the same set of streaming variables.

Embodiments of the present invention include various steps, which have been described above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnet or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. Accordingly, the scope and spirit of the invention should be judged in terms of the claims which follow.

What is claimed is:

1. A method comprising:

streaming a first stream from a first server to a first client over a first streaming connection, said first server communicably connected to a first cluster manager, wherein said first server sends a data relating to said first streaming connection to said first cluster manager in periodic intervals;

streaming a first portion of a second stream from a second server to a second client over a second streaming connection, said second server communicably connected to a second cluster manager, wherein said second server sends a data relating to said second streaming connection to said second cluster manager in periodic intervals;

continually sending said data relating to said second streaming connection from said second cluster manager to said first cluster manager;

continually sending said data relating to said first streaming connection from said first cluster manager to said second cluster manager;

sending said data relating to said second streaming connection from said first cluster manager to said first server; sending said data relating to said first streaming connection from said second cluster manager to said second server;

maintaining, at said first server, a said data relating to said second streaming connection; and determining from said data relating to said second streaming connection periodically sent to the second cluster server that said second server is either inoperative, has an unmanageable server load, or is having communications/network problems;

upon determining that said second server is either inoperative, has an unmanageable server load, or has communications/network problems, communicating to said first cluster manager by said second cluster manager that said second server has a problem;

communicating to said first server by said first cluster manager that said second server has said problem;

upon said first server receiving communication that said second server has said problem, assigning said first server to stream a second portion of said second stream to said second client over a third streaming connection, said first server using said data to comprehend:

a starting point for said second portion, said second portion including content of said second stream that follows and is not included in the content of said second stream encompassed by said first portion; and an at least one handshake parameter for said second client;

wherein said second client connection data includes a media offset value identifying a position within a particular streaming file streamed to said second client over said second streaming connections, and streaming said streaming file from said first server to second client over said third streaming connection starting at a point identified by said media offset value.

2. The method as in claim 1 wherein said data includes a media offset identifying a position within said second stream that has already been streamed to said second client by said second server.

3. The method as in claim 2 wherein:
said media offset is said starting point.

4. The method as in claim 1 wherein said data includes said second client's internet protocol ("IP") address.

5. The method as in claim 1 wherein said data includes a current state of said second streaming connection.

6. The method as in claim 1 wherein said data includes a bit-rate between said second client and said second server.

7. The method as in claim 1 wherein said data includes a bit-rate between said first client and said first server.

8. The method as in claim 1 wherein assigning further comprises:
said assigning said first server based upon said first server having a server load less than other servers in a plurality of servers.

9. The method as in claim 1 wherein said server is said deemed inoperable because an update of said second client connection data was not received at a predetermined time interval.

10. A method comprising:
receiving a first client request from a first client to open a streaming connection;
establishing a first streaming connection between said first client and a first server, said first server communicably connected to a first cluster manager, wherein said first server sends a first client connection data to said first cluster manager in periodic intervals;
receiving a second client request from a second client to open a streaming connection;
establishing a second streaming connection between said second client and a second server, said second server communicably connected to a second cluster manager, wherein said second server sends a second client connection data to said second cluster manager in periodic intervals;
continually sending said second client connection data from said second cluster manager to said first cluster manager;
continually sending said first client connection data from said first cluster manager to said second cluster manager; sending said second client connection data from said first cluster manager to said first server;
sending said first client connection data from said second cluster manager to said second server;
updating at said first server and at said second server a said first and a said second client connection data associated with said first streaming connection and said second streaming connection, respectively, wherein said second client connection data comprises an at least one handshake parameter for said second client;
determining from said second client connection data periodically sent to the second cluster server that said second server is either inoperable, has an unmanageable server load, or is having communications/network problems;
upon determining that said second server is either inoperative, has an unmanageable server load, or has communications/network problems, communicating to said first cluster manager by said second cluster manager that said second server has a problem;
communicating to said first server by said first cluster manager that said second server has said problem;

upon said first server receiving communication that said second server has said problem, establishing a third streaming connection said third streaming connection to resume said second connection by not sending streaming content already transmitted to said second client and by sending streaming content not yet transmitted to said second client, said third streaming connection established between said first server and said second client; and
wherein said second client connection data includes a media offset value identifying a position within a particular streaming file streamed to said second client over said second streaming connections, and streaming said streaming file from said first server to second client over said third streaming connection starting at a point identified by said media offset value.

11. The method as in claim 10 further comprising:
updating said first and second client connection data at predetermined time intervals.

12. The method as in claim 11 wherein said first and second client connection data includes a media offset value identifying a position within a particular streaming file streamed to said first and second clients over said first and second streaming connections, respectively.

13. A system comprising:
means for storing a client connection data on a first streaming server and a second streaming server, said client connection data including a values describing a plurality of client streaming connections that involve different streaming servers, wherein said values comprise an at least one handshake parameter for each of said plurality of client streaming connections, said first streaming server connected to a first cluster manager and said second streaming server connected to a second cluster manager, wherein the first cluster manager is communicably connected to the second cluster manager;
means for transmitting portions of said client connection data from said first streaming server to said second streaming server as new clients establish client streaming connections with said first streaming server;
means for detecting by a first cluster manager from a first client connection data periodically sent from said first streaming server to said first cluster manager that said first server is either inoperative, has an unmanageable server load, or is having communications/network problems;
upon detecting that said first server is either inoperative, has an unmanageable server load, or is having communications/network problems, means for reassigning a client streaming connection from said first streaming server to said second streaming server through said first and second cluster managers responsive to detecting a problem with said first streaming server so as to resume said client streaming connection by not sending streaming content already sent to said client streaming connection's corresponding client and by sending streaming content not yet sent to said corresponding client; and
wherein said second client connection data includes a media offset value identifying a position within a particular streaming file streamed to said second client over said second streaming connections, and streaming said streaming file from said first server to second client over said third streaming connection starting at a point identified by said media offset value.

14. The system as in claim 13 wherein said means for transmitting further comprises:
   means for updating said client connection data at predetermined time intervals.

15. The system as in claim 13 wherein said client connection data includes a media offset value identifying a position within a particular streaming file streamed to said corresponding client from said first server over said client streaming connection.

16. The system as in claim 13 wherein said problem is that said second server is inoperative.

17. The system as in claim 14 wherein detecting a problem with said second server comprises not receiving an update of said client connection data at a predetermined time interval.

18. An article of manufacture including a sequence of instructions, which, when executed by a streaming server, cause said streaming server to:
   store a client connection data, said client connection data including a values describing a plurality of client streaming connections that involve different streaming servers, wherein said values comprise an at least one handshake parameter for each of said plurality of client streaming connections, said plurality of streaming servers each connected to a unique cluster manager, wherein the plurality of cluster manager are communicably connected to one another;
   wherein said client connection data further includes a media offset value identifying a position within a particular streaming file streamed to said client over said streaming connections, said streaming file from said server to client starts at a point identified by said media offset value;
   transmit new portions of said client connection data as new clients establish new client streaming connections;
   receive from a cluster manager of said plurality cluster managers information that a first cluster manager of the plurality of cluster managers has detected from a client connection data periodically sent from a first streaming server to a first cluster manager that said first server is either inoperative, has an unmanageable server load, or is having communications/network problems; and
   upon receiving information that said first server is either inoperative, has an unmanageable server load, or is having communications/network problems, reassign a client streaming connection from said first streaming server to a second streaming server responsive to detecting a problem with said first streaming server so as to resume said client streaming connection by not sending streaming content already sent to said client streaming connection's corresponding client and by sending streaming content not yet sent to said corresponding client.

19. The article of manufacture as in claim 18 including additional instructions which, when executed by a processor, cause said processor to:
   update said client connection data at predetermined time intervals.

20. The article of manufacture as in claim 18 wherein said client connection data includes a media offset value identifying a position within a particular streaming file streamed to said corresponding client.

21. The article of manufacture as in claim 19 wherein said client connection data includes a media offset value identifying a position within a buffer that stores a live webcast.

22. A method comprising:
   streaming a first stream from a first server to a first client over a first streaming connection, said first server communicably connected to a first cluster manager, wherein said first server sends a data relating to said first streaming connection to said first cluster manager in periodic intervals;
   streaming a first portion of a second stream from a second server to a second client over a second streaming connection, said second server communicably connected to a second cluster manager, wherein said second server sends a data relating to said second streaming connection to said second cluster manager in periodic intervals;
   continually sending said second client connection data from said second cluster manager to said first cluster manager;
   continually sending said first client connection data from said first cluster manager to said second cluster manager;
   sending said second client connection data from said first cluster manager to said first server;
   sending said first client connection data from said second cluster manager to said second server;
   maintaining, at said first and second servers, a said data relating to said first and second streaming connections, wherein said data comprises an at least one handshake parameter for said second streaming connection;
   determining from said data relating to said second streaming connection periodically sent to the second cluster server that said second server is either inoperative, has an unmanageable server load, or is having communications/network problems;
   upon determining that said second server is either inoperative, has an unmanageable server load, or has communications/network problems, communicating to said first cluster manager by said second cluster manager that said second server has a problem;
   communication to said first server by said first cluster manager that said second server has said problem;
   upon said first server receiving communication that said second server has said problem, assigning said first server to stream a second portion of said second stream to said second client over a third streaming connection, said first server using said data relating to said second streaming connection to comprehend a starting point for said second portion, said second portion including content of said second stream that follows and is not included in the content of said second stream encompassed by said first portion; and
   wherein said second client connection data includes a media offset value identifying a position within a particular streaming file streamed to said second client over said second streaming connections, and streaming said streaming file from said first server to second client over said third streaming connection starting at a point identified by said media offset value.

* * * * *